US009075955B2

(12) United States Patent
Schieman et al.

(10) Patent No.: US 9,075,955 B2
(45) Date of Patent: Jul. 7, 2015

(54) MANAGING PERMISSION SETTINGS APPLIED TO APPLICATIONS

(71) Applicants: Research In Motion Limited, Waterloo (CA); QNX Software Systems Limited, Kanata (CA)

(72) Inventors: Adam Richard Schieman, Toronto (CA); Daniel Jonas Major, Ottawa (CA); Kevin Goodman, Nepean (CA); Sivakumar Nagarajan, Ottawa (CA)

(73) Assignees: BlackBerry Limited, Waterloo, ON (CA); 2236008 Ontario Inc., Waterloo, ON (CA)

(*) Notice: Subject to any disclaimer, the term of this patent is extended or adjusted under 35 U.S.C. 154(b) by 166 days.

(21) Appl. No.: 13/659,561

(22) Filed: Oct. 24, 2012

(65) Prior Publication Data
US 2014/0115693 A1 Apr. 24, 2014

(51) Int. Cl.
G06F 21/00 (2013.01)
G06F 21/57 (2013.01)
H04L 29/06 (2006.01)
G06F 21/53 (2013.01)
G06F 21/62 (2013.01)

(52) U.S. Cl.
CPC .............. G06F 21/00 (2013.01); G06F 21/577 (2013.01); H04L 63/20 (2013.01); G06F 21/53 (2013.01); G06F 21/6218 (2013.01); G06F 2221/2105 (2013.01); G06F 2221/2149 (2013.01)

(58) Field of Classification Search
CPC ...... G06F 21/552; G06F 21/577; H04L 63/20
USPC .................................................... 726/17, 25
See application file for complete search history.

(56) References Cited

U.S. PATENT DOCUMENTS

| 4,815,128 | A | 3/1989 | Malek |
| 4,837,812 | A | 6/1989 | Takahashi et al. |
| 4,945,556 | A | 7/1990 | Namekawa |
| 4,972,457 | A | 11/1990 | O'Sullivan |
| 4,991,197 | A | 2/1991 | Morris |
| 5,220,604 | A | 6/1993 | Gasser et al. |
| 5,408,520 | A | 4/1995 | Clark et al. |
| 5,606,594 | A | 2/1997 | Register et al. |

(Continued)

FOREIGN PATENT DOCUMENTS

| CA | 2505343 | 6/2010 |
| CN | 101523878 | 9/2009 |

(Continued)

OTHER PUBLICATIONS

Microsoft Office: Microsoft Outlook 2010 Product Guide; Microsoft Corp. published in 2010; 65 pages.

(Continued)

Primary Examiner — Hadi Armouche
Assistant Examiner — Dao Ho
(74) Attorney, Agent, or Firm — Fish & Richardson P.C.

(57) ABSTRACT

Some aspects of what is described here relate to managing permission settings applied to applications on a mobile device. Multiple management policies that apply to an application associated with a perimeter on a device are identified. A priority ranking for each management policy is determined for the application based on the perimeter with which the application is associated. A permission setting based on the priority rankings is applied to the application.

17 Claims, 4 Drawing Sheets

(56) References Cited

U.S. PATENT DOCUMENTS

| | | |
|---|---|---|
| 5,774,551 A | 6/1998 | Wu et al. |
| 5,802,483 A | 9/1998 | Morris |
| 5,826,265 A | 10/1998 | Van Huben et al. |
| 5,850,515 A | 12/1998 | Lo et al. |
| 5,864,765 A | 1/1999 | Barvesten |
| 5,987,440 A | 11/1999 | O'Neil et al. |
| 5,987,611 A | 11/1999 | Freund |
| 6,052,735 A | 4/2000 | Ulrich et al. |
| 6,088,693 A | 7/2000 | Van Huben et al. |
| 6,105,132 A | 8/2000 | Fritch et al. |
| 6,125,447 A | 9/2000 | Gong |
| 6,131,136 A | 10/2000 | Liebenow et al. |
| 6,219,697 B1 | 4/2001 | Lazaridis et al. |
| 6,233,446 B1 | 5/2001 | Do |
| 6,243,756 B1 | 6/2001 | Whitmire et al. |
| 6,253,326 B1 | 6/2001 | Lincke et al. |
| 6,285,889 B1 | 9/2001 | Nykanen et al. |
| 6,292,798 B1 | 9/2001 | Dockter et al. |
| 6,343,313 B1 | 1/2002 | Salesky et al. |
| 6,351,816 B1 | 2/2002 | Mueller et al. |
| 6,360,322 B1 | 3/2002 | Grawrock |
| 6,405,202 B1 | 6/2002 | Britton et al. |
| 6,412,070 B1 | 6/2002 | Van Dyke et al. |
| 6,490,289 B1 | 12/2002 | Zhang et al. |
| 6,516,421 B1 | 2/2003 | Peters |
| 6,647,388 B2 | 11/2003 | Numao et al. |
| 6,668,323 B1 | 12/2003 | Challener et al. |
| 6,745,047 B1 | 6/2004 | Karstens et al. |
| 6,748,543 B1 | 6/2004 | Vilhuber |
| 6,757,821 B1 | 6/2004 | Akiyama et al. |
| 6,772,350 B1 | 8/2004 | Belani et al. |
| 6,775,536 B1 | 8/2004 | Geiger et al. |
| 6,785,810 B1 | 8/2004 | Lirov et al. |
| 6,795,688 B1 | 9/2004 | Plasson et al. |
| 6,795,967 B1 | 9/2004 | Evans et al. |
| 6,886,038 B1 | 4/2005 | Tabbara et al. |
| 6,895,502 B1 | 5/2005 | Fraser et al. |
| 6,901,429 B2 | 5/2005 | Dowling |
| 6,957,330 B1 | 10/2005 | Hughes |
| 6,976,241 B2 | 12/2005 | Cruz et al. |
| 6,978,385 B1 | 12/2005 | Cheston et al. |
| 6,999,562 B2 | 2/2006 | Winick |
| 7,042,988 B2 | 5/2006 | Juitt et al. |
| 7,076,239 B2 | 7/2006 | Kirkup et al. |
| 7,076,797 B2 | 7/2006 | Loveland |
| 7,146,638 B2 | 12/2006 | Malcolm |
| 7,187,678 B2 | 3/2007 | Cunetto et al. |
| 7,246,374 B1 | 7/2007 | Simon et al. |
| 7,315,750 B2 | 1/2008 | Chou et al. |
| 7,330,712 B2 | 2/2008 | Kirkup et al. |
| 7,331,058 B1 | 2/2008 | Gladney |
| 7,400,878 B2 | 7/2008 | Hassan et al. |
| 7,574,200 B2 | 8/2009 | Hassan et al. |
| 7,603,466 B2 | 10/2009 | Kilian-Kehr et al. |
| 7,721,087 B1 | 5/2010 | DiPasquo et al. |
| 7,734,284 B2 | 6/2010 | Adams et al. |
| 7,751,331 B1 | 7/2010 | Blair et al. |
| 7,765,185 B2 | 7/2010 | Rangadass |
| 7,793,355 B2 | 9/2010 | Little et al. |
| 7,869,789 B2 | 1/2011 | Hassan et al. |
| 7,886,053 B1 | 2/2011 | Newstadt et al. |
| 7,917,963 B2 | 3/2011 | Goyal et al. |
| 7,921,452 B2 | 4/2011 | Ridlon et al. |
| 8,005,469 B2 | 8/2011 | Adams et al. |
| 8,074,078 B2 | 12/2011 | Brown et al. |
| 8,208,900 B2 | 6/2012 | Adler et al. |
| 8,495,700 B2 | 7/2013 | Shahbazi |
| 8,495,731 B2 | 7/2013 | Mar et al. |
| 8,503,340 B1 | 8/2013 | Xu |
| 8,931,042 B1 | 1/2015 | Weiss |
| 2001/0047485 A1 | 11/2001 | Brown et al. |
| 2001/0056549 A1 | 12/2001 | Pinault et al. |
| 2002/0013815 A1 | 1/2002 | Obradovich et al. |
| 2002/0019944 A1 | 2/2002 | Kou |
| 2002/0031230 A1 | 3/2002 | Yu et al. |
| 2002/0087880 A1 | 7/2002 | Rhoades |
| 2002/0095414 A1 | 7/2002 | Barnett et al. |
| 2002/0095497 A1 | 7/2002 | Satagopan et al. |
| 2002/0112155 A1 | 8/2002 | Martherus et al. |
| 2002/0184398 A1 | 12/2002 | Orenshteyn |
| 2003/0005317 A1 | 1/2003 | Audebert et al. |
| 2003/0014521 A1 | 1/2003 | Elson et al. |
| 2003/0026220 A1 | 2/2003 | Uhlik et al. |
| 2003/0031184 A1 | 2/2003 | Cunetto et al. |
| 2003/0035397 A1 | 2/2003 | Haller et al. |
| 2003/0054860 A1 | 3/2003 | Chen |
| 2003/0061087 A1 | 3/2003 | Srimuang |
| 2003/0065676 A1 | 4/2003 | Gbadegesin et al. |
| 2003/0070091 A1 | 4/2003 | Loveland |
| 2003/0087629 A1 | 5/2003 | Juitt et al. |
| 2003/0093698 A1 | 5/2003 | Challener et al. |
| 2003/0120948 A1 | 6/2003 | Schmidt et al. |
| 2003/0126437 A1 | 7/2003 | Wheelere et al. |
| 2003/0163685 A1 | 8/2003 | Paatero |
| 2003/0167405 A1 | 9/2003 | Freund et al. |
| 2003/0177389 A1 | 9/2003 | Albert et al. |
| 2003/0226015 A1 | 12/2003 | Neufled et al. |
| 2003/0233410 A1 | 12/2003 | Gusler |
| 2003/0236983 A1 | 12/2003 | Mihm, Jr. et al. |
| 2004/0001101 A1 | 1/2004 | Trajkovic et al. |
| 2004/0083382 A1 | 4/2004 | Markham et al. |
| 2004/0097217 A1 | 5/2004 | McClain |
| 2004/0100983 A1 | 5/2004 | Suzuki |
| 2004/0121802 A1 | 6/2004 | Kim et al. |
| 2004/0177073 A1 | 9/2004 | Snyder et al. |
| 2004/0209608 A1 | 10/2004 | Kouznetsov et al. |
| 2004/0260710 A1 | 12/2004 | Marston |
| 2005/0154935 A1 | 7/2005 | Jin |
| 2005/0164687 A1 | 7/2005 | DiFazio |
| 2005/0192008 A1 | 9/2005 | Desai et al. |
| 2005/0210270 A1 | 9/2005 | Rohatgi et al. |
| 2005/0213763 A1 | 9/2005 | Owen et al. |
| 2005/0245272 A1 | 11/2005 | Spaur et al. |
| 2006/0015621 A1 | 1/2006 | Quinn |
| 2006/0059556 A1 | 3/2006 | Royer |
| 2006/0070114 A1 | 3/2006 | Wood et al. |
| 2006/0090136 A1 | 4/2006 | Miller et al. |
| 2006/0120526 A1 | 6/2006 | Boucher et al. |
| 2006/0129848 A1 | 6/2006 | Paksoy et al. |
| 2006/0129948 A1 | 6/2006 | Hamzy et al. |
| 2006/0149846 A1 | 7/2006 | Schuba |
| 2006/0156026 A1 | 7/2006 | Utin |
| 2006/0168259 A1 | 7/2006 | Spilotro et al. |
| 2006/0168395 A1 | 7/2006 | Deng et al. |
| 2006/0206931 A1 | 9/2006 | Dillaway et al. |
| 2006/0212589 A1 | 9/2006 | Hayer et al. |
| 2006/0242685 A1 | 10/2006 | Heard et al. |
| 2006/0274750 A1 | 12/2006 | Babbar et al. |
| 2007/0019643 A1 | 1/2007 | Sahheen |
| 2007/0050854 A1 | 3/2007 | Cooperstein et al. |
| 2007/0073694 A1 | 3/2007 | Picault et al. |
| 2007/0156766 A1 | 7/2007 | Hoang et al. |
| 2007/0204153 A1 | 8/2007 | Tome et al. |
| 2007/0204166 A1 | 8/2007 | Tome et al. |
| 2007/0254631 A1 | 11/2007 | Spooner |
| 2007/0277127 A1 | 11/2007 | Carlson et al. |
| 2008/0002726 A1 | 1/2008 | Haung et al. |
| 2008/0028442 A1 | 1/2008 | Kaza et al. |
| 2008/0081609 A1 | 4/2008 | Burgan et al. |
| 2008/0098237 A1 | 4/2008 | Dung et al. |
| 2008/0125146 A1 | 5/2008 | Bainbridge |
| 2008/0130524 A1 | 6/2008 | Volach et al. |
| 2008/0132202 A1 | 6/2008 | Kirkup et al. |
| 2008/0134347 A1 | 6/2008 | Goyal et al. |
| 2008/0137593 A1 | 6/2008 | Laudermilch et al. |
| 2008/0184336 A1 | 7/2008 | Sarukkai et al. |
| 2008/0222711 A1 | 9/2008 | Michaelis |
| 2008/0235041 A1 | 9/2008 | Cashdollar et al. |
| 2008/0318616 A1 | 12/2008 | Chipalkatti et al. |
| 2009/0031393 A1 | 1/2009 | Denner |
| 2009/0068996 A1 | 3/2009 | Bakker et al. |
| 2009/0070181 A1 | 3/2009 | Loeffen |
| 2009/0094668 A1 | 4/2009 | Corbin et al. |
| 2009/0178107 A1 | 7/2009 | Karjoth et al. |

(56) References Cited

U.S. PATENT DOCUMENTS

| | | | |
|---|---|---|---|
| 2009/0181662 A1 | 7/2009 | Fleischman et al. | |
| 2009/0254753 A1 | 10/2009 | De Atley et al. | |
| 2009/0260052 A1 | 10/2009 | Bathula et al. | |
| 2009/0300707 A1* | 12/2009 | Garimella et al. | 726/1 |
| 2010/0024016 A1 | 1/2010 | Violleau et al. | |
| 2010/0024020 A1* | 1/2010 | Baugher et al. | 726/7 |
| 2010/0081417 A1 | 4/2010 | Hickie | |
| 2010/0088753 A1 | 4/2010 | Ayres et al. | |
| 2010/0107215 A1 | 4/2010 | Bechtel et al. | |
| 2010/0153969 A1 | 6/2010 | Dyba et al. | |
| 2010/0175104 A1 | 7/2010 | Khalid | |
| 2010/0184440 A1 | 7/2010 | Mao et al. | |
| 2010/0222097 A1 | 9/2010 | Gisby et al. | |
| 2010/0242086 A1 | 9/2010 | Adams et al. | |
| 2010/0274910 A1 | 10/2010 | Ghanaie-Sichanie et al. | |
| 2010/0278162 A1 | 11/2010 | Groux et al. | |
| 2010/0281487 A1 | 11/2010 | Schneider et al. | |
| 2010/0299376 A1 | 11/2010 | Batchu et al. | |
| 2010/0299394 A1 | 11/2010 | Jania et al. | |
| 2010/0299719 A1 | 11/2010 | Burks et al. | |
| 2010/0319053 A1 | 12/2010 | Gharabally | |
| 2010/0325221 A1 | 12/2010 | Cohen et al. | |
| 2010/0325430 A1 | 12/2010 | Denninghoff | |
| 2010/0325710 A1 | 12/2010 | Etchegoyen | |
| 2011/0010699 A1 | 1/2011 | Cooper et al. | |
| 2011/0082808 A1 | 4/2011 | Beykpour et al. | |
| 2011/0099605 A1 | 4/2011 | Cha et al. | |
| 2011/0126214 A1 | 5/2011 | O'Farrell et al. | |
| 2011/0145833 A1 | 6/2011 | De Los Reyes et al. | |
| 2011/0179083 A1 | 7/2011 | Galloway et al. | |
| 2011/0195698 A1 | 8/2011 | Pearce | |
| 2011/0210171 A1 | 9/2011 | Brown et al. | |
| 2011/0252240 A1 | 10/2011 | Freedman et al. | |
| 2011/0270963 A1* | 11/2011 | Saito et al. | 709/224 |
| 2011/0314467 A1 | 12/2011 | Pearson | |
| 2012/0005477 A1 | 1/2012 | Wei et al. | |
| 2012/0005723 A1 | 1/2012 | Chaturvedi et al. | |
| 2012/0005745 A1 | 1/2012 | Wei et al. | |
| 2012/0023573 A1 | 1/2012 | Shi | |
| 2012/0054853 A1 | 3/2012 | Gupta et al. | |
| 2012/0079110 A1 | 3/2012 | Brown et al. | |
| 2012/0079586 A1 | 3/2012 | Brown et al. | |
| 2012/0079609 A1 | 3/2012 | Bender et al. | |
| 2012/0109826 A1 | 5/2012 | Kobres | |
| 2012/0131685 A1 | 5/2012 | Broch et al. | |
| 2012/0144196 A1 | 6/2012 | Owen et al. | |
| 2012/0157166 A1 | 6/2012 | Kim et al. | |
| 2012/0202527 A1 | 8/2012 | Obradovich et al. | |
| 2012/0210443 A1 | 8/2012 | Blaisdell et al. | |
| 2012/0214442 A1 | 8/2012 | Crawford et al. | |
| 2012/0214503 A1 | 8/2012 | Liu et al. | |
| 2012/0278863 A1 | 11/2012 | Wallace et al. | |
| 2012/0278904 A1 | 11/2012 | Perez et al. | |
| 2012/0291140 A1 | 11/2012 | Robert et al. | |
| 2012/0309344 A1 | 12/2012 | Ferrazzini et al. | |
| 2012/0324067 A1 | 12/2012 | Hari et al. | |
| 2013/0074142 A1 | 3/2013 | Brennan et al. | |
| 2013/0097657 A1 | 4/2013 | Cardamore et al. | |
| 2013/0174222 A1 | 7/2013 | Ogle | |
| 2013/0219465 A1 | 8/2013 | Tse et al. | |
| 2013/0346606 A1 | 12/2013 | Ryerson et al. | |

FOREIGN PATENT DOCUMENTS

| | | |
|---|---|---|
| EP | 0605106 | 7/1994 |
| EP | 973350 | 1/2000 |
| EP | 1168141 | 1/2002 |
| EP | 1471691 | 10/2004 |
| EP | 1596410 | 11/2005 |
| EP | 1624428 | 2/2006 |
| EP | 1806674 | 7/2007 |
| EP | 1563663 | 10/2008 |
| EP | 2337300 | 6/2011 |
| GB | 2378780 | 2/2003 |
| GB | 2408179 | 5/2005 |
| GB | 2440015 | 1/2008 |
| JP | 2000-253241 | 9/2000 |
| JP | 2001-077811 | 3/2001 |
| JP | 2001-203761 | 7/2001 |
| JP | 2002-288087 | 10/2002 |
| WO | 96/25828 | 8/1996 |
| WO | 99/05814 | 2/1999 |
| WO | 00/59225 | 10/2000 |
| WO | 00/60434 | 10/2000 |
| WO | 2004017592 | 2/2004 |
| WO | 2004043031 | 5/2004 |
| WO | 2005045550 | 5/2005 |
| WO | 2006/130807 | 12/2006 |
| WO | 2007048251 | 5/2007 |
| WO | 2009/012329 | 1/2009 |
| WO | 2009014975 | 1/2009 |
| WO | 2009021200 | 2/2009 |
| WO | 2012037656 | 3/2012 |
| WO | 2012037657 | 3/2012 |
| WO | 2012037658 | 3/2012 |

OTHER PUBLICATIONS

Windows 7 Product Guide; Microsoft Corp. published in 2009; 140 pages.

Extended European Search Report issued in European Application No. 12173030.3 on Nov. 22, 2012; 6 pages.

IETF RFC 3530; "Network File System (NFS) Version 4 Protocol"; Apr. 2003.

"Secure Inter-Process Communication"; Apr. 4, 2004. Retrieved from internet on Jan. 20, 2014 https://web.archive.org/web/20040404015137/http://cr.yp.to/docs/secureipc.html.

Notice of Allowance issued in Canadian Application No. 2,769,646 on Feb. 15, 2013; 1 page.

Examiner's First Report issued in Australian Application No. 2012203391 on Jan. 22, 2014; 4 pages.

Advisory Action issued in U.S. Appl. No. 13/293,743 on Nov. 26, 2013; 3 pages.

Advisory Action issued in U.S. Appl. No. 13/275,097 on Dec. 6, 2013; 4 pages.

Office Action issued in U.S. Appl. No. 13/722,213 on Dec. 4, 2013; 6 pages.

Notice of Allowance issued in U.S. Appl. No. 13/722,213 on Jan. 29, 2014; 7 pages.

International Preliminary Report on Patentability under Chapter II issued in International Application No. PCT/CA2012/050797 on Feb. 12, 2014; 13 pages.

Google Inc.; Android 2.3.4 User's Guide; May 20, 2011; 384 pages.

Microsoft Corp.; Microsoft Outlook 2010; Released Jul. 15, 2010; 27 pages.

Office Action issued in U.S. Appl. No. 13/293,743 on Feb. 14, 2013; 15 pages.

Office Action issued in U.S. Appl. No. 13/274,913 on Jan. 23, 2013; 22 pages.

International Search Report and Written Opinion issued in International Application No. PCT/CA2012/050797 on Feb. 5, 2013; 8 pages.

Office Action issued in U.S. Appl. No. 13/25,097 on Feb. 28, 2013; 18 pages.

Extended European Search Report issued in European Application No. 12189773.0 on Mar. 7, 2013; 8 pages.

International Search Report and Written Opinion of the International Searching Authority issued in International Application No. PCT/CA2012/050796 on Feb. 21, 2013; 13 pages.

Notice of Allowance issued in U.S. Appl. No. 13/490,956 on Dec. 4, 2013; 8 pages.

Office Action issued in U.S. Appl. No. 13/296,963 on Nov. 18, 2013; 23 pages.

Notice of Allowance issued in U.S. Appl. No. 13/398,676 on Nov. 7, 2013; 22 pages.

Office Action issued in U.S. Appl. No. 13/274,913 on Jan. 2, 2014.

Notice of Allowance issued in U.S. Appl. No. 13/659,527 on Oct. 7, 2013; 15 pages.

(56) References Cited

OTHER PUBLICATIONS

Office Action issued in Canadian Application No. 2,564,914 on Dec. 3, 2013; 2 pages.
Office Action issued in Chinese Application No. 201110308441.4 on Oct. 25, 2013; 9 pages.
Office Action issued in U.S. Appl. No. 13/293,743 on Sep. 20, 2013; 19 pages.
Office Action issued in U.S. Appl. No. 13/274,913 on Jul. 16, 2013.
Office Action issued in U.S. Appl. No. 13/25,097 on Sep. 10, 2013; 21 pages.
Office Action issued in U.S. Appl. No. 13/098,456 on Apr. 17, 2013; 31 pages.
Office Action issued in U.S. Appl. No. 13/098,456 on Sep. 27, 2013; 28 pages.
Extended European Search Report issued in European Application No. 11188696.6 on Apr. 12, 2012; 7 pages.
Office Action issued in U.S. Appl. No. 13/398,676 on Sep. 5, 2012; 21 pages.
Extended European Search Report issued in European Application No. 11186802.2 on Jan. 18, 2012; 7 pages.
Extended European Search Report issued in European Application No. 11186796.6 on Jan. 18, 2012; 8 pages.
Ferguson et al., U.S. Appl. No. 13/293,743, "Managing Cross Perimeter Access," filed Nov. 10, 2011.
Office Action issued in U.S. Appl. No. 13/529,509 on Mar. 25, 2014.
International Preliminary Report on Patentability under Ch. II issued in International Application No. PCT/CA2012/050796 on Mar. 10, 2014; 18 pages.
View messages with restricted permission sent by using IRM; Support/Outlook/Outlook 2007 Help and How-to. http://office.mircosoft.com/en-us/outlook-help/view-messages-with-restricted-permission-sent-by-using-irm-HA010246115.as . . . , pp. 1-2, retrieved on Feb. 12, 2010.
Send an e-mail message with restricted permission by using IRM; Support/Outlook/Outlook 2007 Help and How to. http://office.mircosoft.com/en-us/outlook-help/send-an-e-mail-message-with-restricted-permission-by-using-irm-HA01024780 . . . , pp. 1-4, retrieved on Feb. 12, 2010.
Introduction to using IRM for e-mail messages; Support/Outlook/Outlook 2007 Help and How-to. http://office.microsoft.com/en-us/outlook-help/introduction-to-using-irm-for-e-mail-message-HA010100366.aspx?CTT=5 . . . , pp. 1-6, retrieved on Feb. 12, 2010.
EP Application No. 12155659.1, Extended European Search Report dated Jan. 8, 2012.
Smartphone Security Beyond Lock and Wipe (Jun. 10, 2010): http://www.enterprisemobiletoday.com/article.php/3887006.
Basic Access Authentication (Jan. 23, 2010): http://en.wikipedia.org/wiki/Basic_access_authentication.
Digital Access Authentication (Dec. 23, 2009): http://en.wikipedia.org/wiki/Digest_access_authentication.
Cross-site request forgery (Nov. 30, 2008): http://en.wikipedia.org/wiki/Cross-site_request_forgery.
Extended European Search Report mailed Jul. 13, 2012, in corresponding European patent application No. 12153439.0.
"Customizing User Interaction in Smart Phones", Pervasive Computing, IEEE CS (2006) pp. 81-90 (URL: http://www.idi.ntnu.no/grupperlsu/bibliography/pdf/2006/Korpipaa2006pc.pdf).
"Supporting Mobile Privacy and Security through Sensor-Based Context Detection", Julian Seifert, Second International Workshop on Security and Privacy in Spontaneous Interaction and Mobile Phone Use, May 17, 2010, Finland (U RL: http://www.medien.ifi.lmu.de/iwssi201 0/papers/iwssi-spmu201 O-seifert.pdf).
"Using context-profiling to aid access control decisions in mobile devices", Gupta et al., Nokia Research Center (URL: http://www.cerias.purdue.edu/assets/symposium/2011-posters1372-C48.pdf) Please refer to the I-page file named 372-C48.pdf.
Owen, Russell N., U.S. Appl. No. 10/524,353, filed Feb. 14, 2005; Title: System and Method for Secure Control of Resources of Wireless Mobile Communication Device.

International Application No. PCT/CA 03101245, International Search Report dated Dec. 23, 2003.
International Application No. PCT/CA 03101245, PCT Written Opinion, dated Apr. 23, 2004.
International Application No. PCT/CA 03101245, PCT Written Opinion, dated Sep. 20, 2004.
International Application No. PCT/CA 03101245, PCT International Preliminary Examination Report, dated Nov. 29, 2004.
"Owen, Russell N., U.S. Appl. No. 13/371,093, filed Feb. 10, 2012; Title: System and Method for Secure Control of Resources of Wireless Mobile Communication Devices Secure Control of Resources of Wireless Mobile Communication Device".
Int'l Search Report and the Written Opinion of the Int'l Searching Authority, or the Declaration of Appln. Serial No. PCT/CA2004/000250 of Feb. 120, 2004—12 pgs.
Int'l Search Report or the Declaration of Appln. Serial No. PCT/CA03/01679 of Oct. 131, 2003—6 pgs.
Red Hat: "Red Hat Linux 7.2—The Official Red Had Linux Reference Guide" Red Hat Linux Manuals, Online!, Oct. 22, 2001, XP002276029, pp. 145-155.
Sygate: "Sygate Personal Firewall PRO User Guide" Sygate Personal Firewall Pro User Guide version 2.02001, pp. 1-77, XP002248366.
Bender, Christopher Lyle; U.S. Appl. No. 13/074,136, filed Mar. 29, 2011; Title: Data Source Based Application Sandboxing.
"A Technical Overview of the Lucent VPN Firewall" White Paper Lucent Technologies, Aug. 2002, pp. 1-35, XP002271173, Chapter 1.
European Search Report of Appln. No. 04256690.1-2412, date of mailing Apr. 6, 2005—9 pgs.
Fourth Office Action. Chinese Application No. 200380105435.2. Dated: Aug. 3, 2011.
Patent Certificate. Indian Patent Application No. 1956/DELNP/2005. Dated: Oct. 31, 2003.
Certificate of Grant of Patent. Singapore Patent No. 112419. Dated: Apr. 30, 2007.
Certificate of Grant of Patent. Hong Kong Patent No. 1080315. Dated: Apr. 24, 2009.
Notice of Allowance. Canadian Application No. 2,505,343. Dated: Sep. 15, 2009.
Extended European Search Report issued in European Application No. 12189805.0 on Apr. 16, 2013; 6 pages.
Office Action issued in U.S. Appl. No. 11/118,791 on Sep. 25, 2006; 11 pages.
Office Action issued in U.S. Appl. No. 11/118,791 on Nov. 28, 2007; 12 pages.
Office Action issued in U.S. Appl. No. 11/118,791 on Mar. 30, 2007; 12 pages.
Office Action issued in U.S. Appl. No. 11/118,791 on May 20, 2008; 13 pages.
Office Action issued in U.S. Appl. No. 11/118,791 on Jan. 27, 2009; 16 pages.
Office Action issued in U.S. Appl. No. 11/118,791 on Apr. 8, 2009; 14 pages.
Advisory Action issued in U.S. Appl. No. 11/118,791 on Jun. 26, 2009; 8 pages.
Notice of Allowance issued in U.S. Appl. No. 11/118,791 on Jan. 20, 2010; 4 pages.
Office Action issued in U.S. Appl. No. 12/795,252 on Aug. 6, 2010; 6 pages.
Notice of Allowance issued in U.S. Appl. No. 12/795,252 on Dec. 17, 2010; 4 pages.
Notice of Allowance issued in U.S. Appl. No. 12/795,252 on Apr. 14, 2011; 4 pages.
Examiner's First Report issued in Australian Application No. 2005239005 on Oct. 15, 2007; 2 pages.
Examiner's Report No. 2 issued in Australian Application No. 2005239005 on Jul. 15, 2009; 2 pages.
Examiner's First Report issued in Australian Application No. 2009202857 on Nov. 5, 2010; 3 pages.
Office Action issued in Canadian Application No. 2,564,914 on May 3, 2010; 4 pages.
Office Action issued in Canadian Application No. 2,564,914 on Apr. 4, 2011; 2 pages.

(56) References Cited

OTHER PUBLICATIONS

First Office Action issued in Chinese Application No. 200580013730.4 on Mar. 27, 2009; 9 pages.
Second Office Action issued in Chinese Application No. 200580013730.4 on Dec. 12, 2010; 10 pages.
Third Office Action issued in Chinese Application No. 200580013730.4 on Mar. 8, 2011; 10 pages.
Notice of Allowance issued in Chinese Application No. 200580013730.4 on Jul. 28, 2011; 4 pages.
European Supplementary Search Report issued in European Application No. 05738877.9 on Sep. 13, 2007; 3 pages.
Communication Pursuant to Article 94(3) EPC issued in European Application No. 05738877.9 on Jan. 15, 2008; 4 pages.
Communication Pursuant to Article 94(3) EPC issued in European Application No. 05738877.9 on Jul. 15, 2009; 4 pages.
Communication under Rule 71(3) EPC issued in European Application No. 05738877.9 on Sep. 17, 2010; 41 pages.
First Examination Report issued in Indian Application No. 6068/DELNP/2006 on Jun. 3, 2010; 2 pages.
Notice of Reasons for Rejection issued in Japanese Application No. 2007-509840 on Jun. 15, 2009; 5 pages.
Notice of Allowance issued in Japanese Application No. 2007-509840 on Jan. 25, 2010; 3 pages.
Notice Requesting Submission of Opinion issued in Korean Application No. 10-2006-7025081 on Nov. 16, 2007; 10 pages.
Notice of Decision of Final Rejection issued Korean Application No. 10-2006-7025081 on Jun. 18, 2008.
Trial Decision issued in Korean Application No. 10-2006-7025081 on Jul. 27, 2009; 10 pages.
Notice of Decision for Patent issued in Korean Application No. 10-2006-7025081 on Aug. 7, 2009; 3 pages.
International Search Report issued in International Application No. PCT/CA2005/000652 on Aug. 17, 2005; 9 pages.
International Preliminary Report on Patentability under Chapter I issued in International Application No. PCT/CA2005/000652 on Nov. 9, 2006; 6 pages.
Office Action issued in U.S. Appl. No. 13/659,527 on May 23, 2013; 8 pages.
Office Action issued in U.S. Appl. No. 13/722,213 on May 22, 2013; 8 pages.
Office Action issued in Canadian Application No. 2,769,646 on Jun. 5, 2012; 3 pages.
Office Action issued in Canadian Application No. 2,769,646 on Oct. 22, 2012; 2 pages.
International Search Report and Written Opinion of the International Searching Authority issued in International Application No. PCT/CA2011/050707 on Jan. 18, 2012; 7 pages.
International Preliminary Report on Patentability issued in International Application No. PCT/CA2011/050707 on May 30, 2013; 4 pages.
Research In Motion, "BlackBerry Bridge App 2.1 and Blackberry PlayBook Tablet 2.1, Security Technical Overview"; Version: 2.1; Jul. 17, 2012; 43 pages.
Research In Motion, "BlackBerry Device Service 6.1 and BlackBerry PlayBook Tablet 2.1, Security Technical Overview"; Version: 6.1; Sep. 17, 2012; 90 pages.
Office Action issued in U.S. Appl. No. 10/524,353 on Sep. 21, 2012; 16 pages.
Office Action issued in U.S. Appl. No. 13/098,456 on Sep. 13, 2012; 20 pages.
International Search Report and Written Opinion issued in International Application No. PCT/CA2011/001058 on Dec. 21, 2011; 9 pages.
XP002167366, Chen, Zhigun; "Java Card Technology for Smart Cards: Architecture and Programmer's Guide"; "Applet Firewall and Object Sharing," Internet citation; Jun. 2, 2000; <http://developer.java.sun.com/developer/Books/consumerproducts/javacard/ch09.pdf>.
Communication Pursuant to Article 94(3) EPC issued in European Application No. 11186796.6 on Aug. 29, 2014; 5 pages.
Office Action issued in Canadian Application No. 2,792,772 on Sep. 5, 2014; 3 pages.
Office Action issued in Canadian Application No. 2,792,707 on Sep. 8, 2014; 3 pages.
Office Action issued in U.S. Appl. No. 13/296,963 on Oct. 3, 2014.
Office Action issued in U.S. Appl. No. 13/293,743 on Jul. 16, 2014.
Office Action issued in U.S. Appl. No. 13/274,913 on Jul. 1, 2014.
Office Action issued in U.S. Appl. No. 13/25,097 on Jul. 16, 2014.
Office Action issued in U.S. Appl. No. 13/659,561 on Jul. 2, 2014.
Extended European Search Report mailed Mar. 17, 2014 in European Application No. 11162178.5.
Office Action issued in Chinese Application No. 201110308441.4 on Jul. 8, 2014; 4 pages. No translation.
EagleVision: A Pervasive Mobile Device Protection System, Ka Yang, Nalin Subramanian, Daji Qiao, and Wen sheng Zhang, Iowa State University (URL: http://www.cs.iastate.edu/-wzhang/papers/eagleVision.pdf) Jul. 13-16, 2009.
Notice of Acceptance issued in Australian Application No. 2012203391 on Jul. 25, 2014; 2 pages.
Communication pursuant to Article 94(3) issued in EP Application No. 11186802.2 on Aug. 25, 2014.
Communication Pursuant to Article 94(3) EPC issued in European Application No. 11188696.6 on Jul. 9, 2013; 4 pages.
Office Action issued in Canadian Application No. 2,820,687 on Nov. 3, 2014; 3 pages.
United States Office Action in U.S. Appl. No. 13/275,097, dated Feb. 24, 2015, 22 pages.
United States Office Action in U.S. Appl. No. 13/293,743, dated Apr. 8, 2015, 15 pages.
United States Office Action in U.S. Appl. No. 14/163,416, dated Feb. 17, 2015, 13 pages.
United States Office Action in U.S. Appl. No. 13/529,509, dated Apr. 8, 2015, 13 pages.

* cited by examiner

410 — Identify multiple management policies that apply to an application associated with a perimeter on a device 420 — Determine a priority ranking for each of the multiple management policies for the application 430 — Apply a permission setting to the application based on the priority rankings of the multiple management policies

MANAGING PERMISSION SETTINGS APPLIED TO APPLICATIONS

BACKGROUND

This disclosure relates to managing permission settings applied to applications on a device. Many communication devices include data, applications, and network resources whose accessibility is controlled by permission settings. For example, user accounts, administration rights, database management, and others may be managed by with permission settings.

DESCRIPTION OF THE DRAWINGS

FIG. 4 is a flow chart showing an example process for managing permission settings applied to applications on a mobile device.

Like reference numbers and designations in the various drawings indicate like elements.

DETAILED DESCRIPTION

Figure 1:
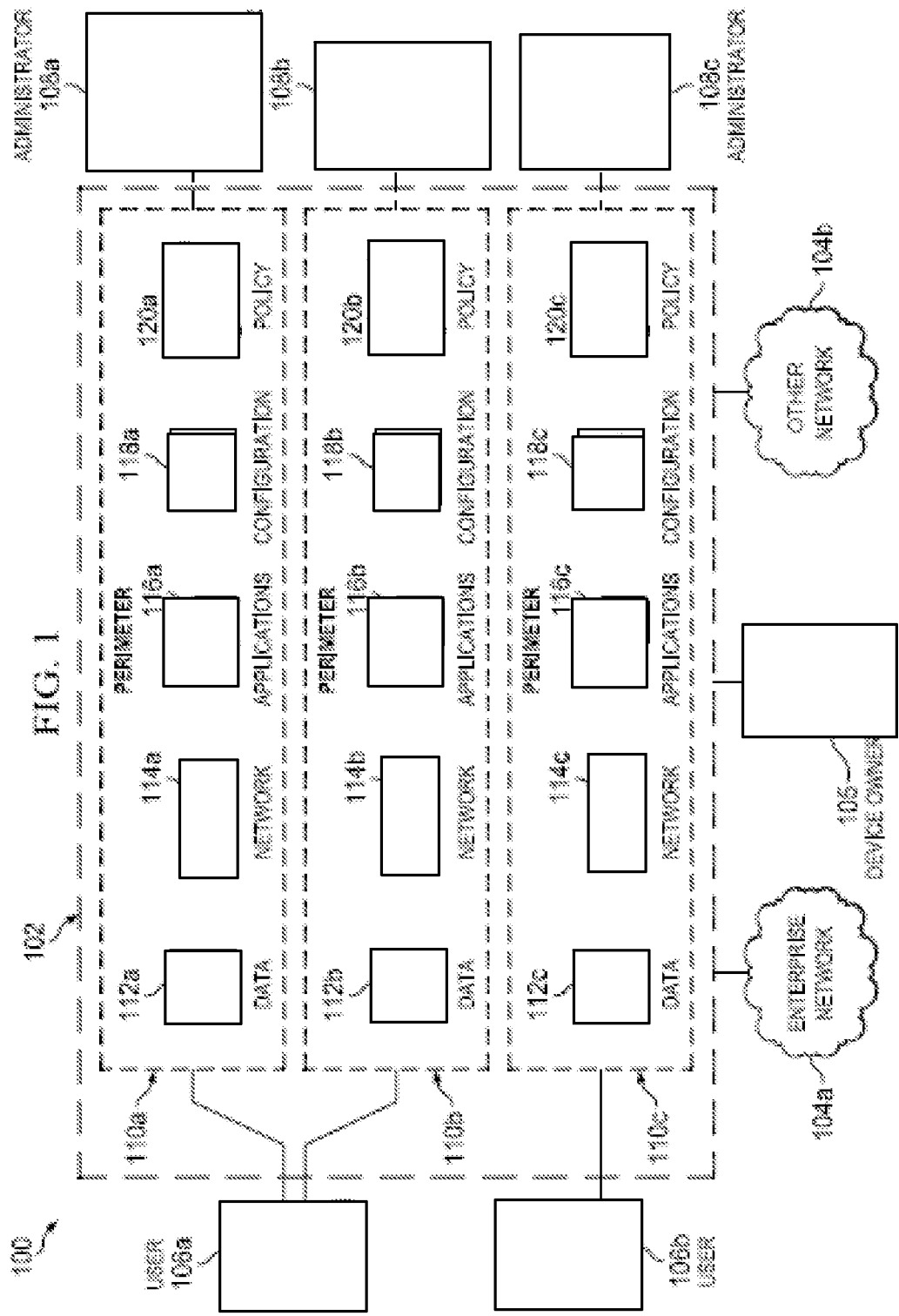
FIG. 1 is a schematic diagram showing an example data communication system.

Perimeters, as used in the present disclosure, generally refer to groups of resources having a common management scheme, and each perimeter generally includes one or more resources and one or more policies regarding use of or access to the one or more resources. Perimeters may be implemented on data communication systems that include a device, and can be used to logically separate information (e.g., files, applications, certificates, configuration data, network connections, data, and the like) on the device. For example, the device can implement two or more perimeters, which can include a personal perimeter, an enterprise or work perimeter, any suitable combination of these and other types of perimeters. In some embodiments, the device may include multiple personal perimeters, multiple enterprise perimeters, or both. A personal perimeter can be managed by a device user, and an enterprise perimeter can be managed by an enterprise or corporate administrator. In some implementations, the enterprise or corporate administrator can additionally manage the personal perimeter or the device or both. A device purchased, owned, or otherwise provided by an enterprise, employer or corporation may generally be referred to as a corporate-liable device, while a device purchased, owned or otherwise provided by an employee or individual may generally be referred to as a personal-liable device or an individual-liable device.

In some implementations, each perimeter on a device has its own file system on the device, and separation between perimeters can be provided, at least partially, by the separation of the file systems on the device. In some cases, some of the resources of each perimeter (e.g., data and policies) are stored in a dedicated file system for the perimeter, while other resource of each perimeter (e.g., applications) are stored outside of the dedicated file system.

Separation of file systems can be logical, physical, or both. A physical separation of file systems can be implemented, for example, by designating physically separate memory locations (e.g., separate memory devices, or separate blocks in the same memory) for each file system. A logical separation of file systems can be implemented, for example, by designating logically separate data structures (e.g., separate directories, etc.) for each file system. In some implementations, each file system has its own encryption parameters. For example, the file system for a corporate perimeter can have its own encryption key and a higher encryption strength, while a file system for a personal perimeter can have its own encryption key and lower encryption strength. In some instances, the file system for the personal perimeter has the same encryption strength as the corporate perimeter, or the file system for the personal perimeter can be unencrypted.

As described above, a perimeter can include a group of resources that share a common management scheme governing the use of resources in the group and can encompass both the resources and the management policies that describe how the resources may be used. The management policies can include security restrictions, which are defined for the perimeter. Applications executable by the device can include resources that, when executed, request access to other resources or provide resources to other applications (or both). For an application that is assigned to or associated with a perimeter, resources included in the application can be included in the group of resources included in the perimeter. Further, security restrictions defined for the perimeter can restrict the application to resources included in the group. Thus, when the application is executed within the perimeter, security restrictions included in the management policies of the perimeter can determine whether or not the resources associated with the application can access other resources, such as resources included in the group or resources outside the group (or both), or grant access to other applications, such as applications assigned to or associated with or not assigned to or associated with the perimeter (or both).

When a resource (e.g., an application) is "launched into" a perimeter, an instance of the application is instantiated in the perimeter. The management policy of the perimeter where an application is launched can determine, at least partially, what resources (e.g., data resources, network resources, etc.) the application can access or execute. As such, when an instance of application is running in a perimeter, permissions for the instance of the application are determined based at least partially on the management policy of the perimeter. For some applications, access to resource outside a perimeter can be determined, at least partially, based on the policies of the other perimeter.

In some implementations, a secure perimeter can divide or segregate different categories of data (e.g., work data, personal data, etc.) from the operating system level all the way to the user interface. As such, the perimeter architecture can provide protection of data at the operating system level, the file level, the user interface level, and other levels of the device. A secure perimeter can, in some cases, ensure a complete separation between the different categories of data, applications and the user experience, while at the same time also allowing the different categories of data to co-exist in the same application and share data when desired. A secure perimeter can allow for "hybrid apps," such as, for example, a unified inbox showing both personal and corporate email. In some instances, applications can be limited to an individual perimeter view (e.g., a "work" or "personal" perimeter view). For example, a social networking application can be configured to appear only in the personal perimeter. In some instances, separate instances of the same application can run in multiple perimeters. For example, a device can have an instance of a social networking application (e.g., Facebook, Twitter, etc.) running in a personal perimeter for a user's personal account, and the device can have an instance of the same social networking application running in a corporate perimeter for the user's company or the user's corporate account.

A data communication system can include a user device, for example, a mobile device, that provides multiple computer software applications. Providing an application can include execution of one or more actions, for example, by the device. The actions can include installation actions to install the application on the device, execution actions to execute the application, data access actions to enable the application to access data stored on the device or to enable other applications to access data associated with the application (or combinations of them), uninstallation actions to uninstall the application from the device, and the like. The application can be associated with permissions that define whether or not the device can perform one or more of the actions.

The permissions can be defined (for example, granted) by several management sources or policies (or both) such as, for example, a vendor who provides the application, users of the device, an enterprise, a perimeter with which the application is associated, and the like. A perimeter can be implemented on the device and can be used to logically separate information (for example, data, applications, network resources, and the like). The perimeter can be a personal perimeter, an enterprise perimeter, or any suitable combination of these and other types of perimeters. The personal perimeter and the enterprise perimeter can be managed by, and consequently associated with, respective management policies of users of the device and corporate administrators, respectively.

In some implementations, permissions for an application indicate what actions the application is authorized to do on a device. For example, permissions for an application can indicate types of data resources, network resources, or other resources the application can access, read, write, modify, or execute, or an application can have another type of permission setting. Permissions for an application can include the application's disposition. The disposition of an application can indicate whether the application is permitted on the device. For example, an application can be authorized, unauthorized, or enabled on the device, or the application can have another type of disposition.

In some instances, a permission setting is applied to the application. The permission setting can be determined based on multiple management sources or policies associated with the application or the device that executes the application (or both). In some implementations, multiple management policies that apply to an application associated with a perimeter on a device can be identified. For each of the multiple management policies, a priority ranking can be determined. The priority ranking can be determined based on the perimeter with which the application is associated. Based on the priority rankings for the multiple management policies, a permission setting can be applied to the application. For example, a centralized policy engine can be included in the device to receive permission decisions from the multiple management policies and generate the permission setting that is applied to the application. In one example, the centralized policy engine can receive a user management policy which allows the execution of a Global Positioning System (GPS) application and a parental control management policy which denies execution of the GPS application. The centralized policy engine can determine that the parental control management policy has a higher priority rank than the user management policy, and can accordingly apply a permission setting to the GPS application that disallows the application's execution when requested by a user who defined the user management policy.

FIG. 1 is a schematic diagram showing an example data communication system 100. The example data communication system 100 includes a device 102, an enterprise network 104a, and one or more other networks 104b. A data communication system may include additional, different, or fewer features, as appropriate. The diagram in FIG. 1 also shows interactions by users 106a, 106b, by a device owner 105, and by administrators 108a, 108b, 108c. In some cases, the device owner 105 can be one of the users 106a or 106b, a business enterprise, or another entity. Additional, different, or fewer entities may interact with a data communication system, as appropriate in various implementations.

The device 102 can be any suitable computing device. Generally, a computing device includes a computer-readable medium and data processing apparatus. The computer-readable medium may include any suitable memory, disc, storage device, or other apparatus configured to store machine-readable information. The computer-readable medium can store instructions that are executable by the data processing apparatus. The data processing apparatus can include any suitable processor, controller, circuitry, or other apparatus configured to perform operations based on machine-readable instructions. The data processing apparatus can include a programmable processor, digital logic circuitry, firmware, or any other suitable device. The computer-readable medium can include a single medium or multiple media, and the data processing apparatus can include a single apparatus or multiple apparatus.

The example device 102 is operable to receive requests from the user via a user interface, such as a graphical user interface or any other suitable user interfaces. As shown in FIG. 1, the device 102 is communicably coupled to the enterprise network 104a and to one or more other networks 104b. The example device 102 is operable to receive, transmit, process and store any appropriate data. For example, the device 102 can comprise a smartphone, a tablet computer, a personal computer, a laptop computer, a personal data assistant (PDA), or another type of user device. The device 102 may include an input device, such as a keypad, touch screen, mouse, or other device that can accept information, and an output device (e.g., display screen) that conveys information associated with the operation of the resources. Both the input device and output device may include fixed or removable storage media (for example, memory, etc.) to both receive input from and provide output to users through the display.

As shown in FIG. 1, the device 102 includes three example perimeters 110a, 110b, and 110c (individually and collectively referred to as "perimeters 110"). Each perimeter 110 includes data 112, network access resources 114, one or more applications 116, one or more configuration files 118, and one or more policies 120. A perimeter 110 may include only a subset of the illustrated resources, or a perimeter 110 may include additional or different resources.

The example perimeters 110 can logically separate resources (e.g., applications, data, network access resources, configuration files, etc.) such that resources in a given perimeter can, in some instances, be prevented from accessing resources included in a different perimeter. For example, personal resources in one perimeter may be prevented from accessing corporate resources in another perimeter, or vice-versa. In some cases, an enterprise may extend a secured perimeter on a single user device without interfering with the user's personal experience on the same device. The perimeters may also permit cross-perimeter access to resources. Access to perimeter resources may be controlled by defining, assigning or otherwise associating a policy to each perimeter.

A policy for a perimeter can be implemented in any suitable format, using any appropriate information. A policy can specify access to both the external resources (in another perimeter) that can be accessed by internal applications (running in the perimeter) and internal resources that can be accessed by external applications. For example, a given perimeter's policy may identify other perimeters that are accessible, internal resources that are not accessible to other perimeters, or both. A perimeter's policy may identify specific users that can or cannot access specified resources in the perimeter. In some implementations, the policies from both perimeters determine whether cross-perimeter access is granted.

The perimeter architecture enables a logical separation of computing resources such that transferring data between perimeters and accessing resources of other perimeter can be controlled. Resources may include applications, file systems, network access, or other computer resources. In addition to enabling access to resources within a perimeter, the example data communication system 100 may include a policy that identifies specific external resources that a resource in a perimeter may access. The example data communication system 100 may manage a seamless user experience in which the perimeter concept is executed.

A perimeter 110 may include password protection, encryption, and other process for controlling access to resources assigned to the perimeter. A perimeter 110 may be generated by the device owner, a user, an administrator, or others. In some examples, the perimeter 110a may be a personal perimeter created for the user 106a and managed by the user 106a. In some examples, the perimeter 110b may be an enterprise perimeter created by an administrator 108b for an enterprise and may be managed by a remote management server. In addition, a given perimeter may be accessed by the device owner 105, a user, an administrator, or any suitable combination. In some implementations, each perimeter may be associated with a single user, and at least some users may access multiple device perimeters. For example, the first user 106a may access resources within both the perimeter 110a and the perimeter 110b, and the second user 106b may have access to only one perimeter 110c.

In some instances, individual perimeters may be added, deleted, or modified. The device owner 105 may have the ability to add or remove individual perimeters 110 from the device 102. In some implementations, a user can create a perimeter. In some instances, an organization associated with the enterprise network 104a can send the device information identifying the initial resources (e.g., applications, policies, configurations, etc.) for a new perimeter. A perimeter administrator may assign policies for the perimeters and initiate perimeter updates. In some implementations, perimeter administrators can remotely lock or wipe a perimeter.

Information may be stored on the device 102 in any suitable memory or database module. Example memories include volatile and non-volatile memory, magnetic media, optical media, random access memory (RAM), read-only memory (ROM), removable media and others. The data 112 can include any suitable information. The device 102 can store various objects, including files, classes, frameworks, backup data, business objects, jobs, web pages, web page templates, database tables, repositories storing business or dynamic information, and any other appropriate information including any parameters, variables, algorithms, instructions, rules, constraints, or references thereto. The data 112 may include information that is associated with an application, a network, a user, and other information.

The network access resources 114 can include any suitable parameters, variables, policies, algorithms, instructions, settings, or rules for granting access to networks. For example, the network access resources 114a may include or identify firewall policies for accessing the enterprise network 104a. As another example, the network access resources 114b may include or identify account data for accessing one or more of the other networks 104b. In some implementations, network access resources include or otherwise identify one or more of the following: a username; a password; a security token; a Virtual Private Network (VPN) configuration; firewall policies; a communication protocol; encryption key certificate; or others.

The applications 116 can include any suitable program, module, script, process, or other object that can execute, change, delete, generate, or process information. For example, applications can be implemented as Enterprise Java Beans (EJBs). Design-time components may have the ability to generate run-time implementations into different platforms, such as J2EE (Java 2 Platform, Enterprise Edition), ABAP (Advanced Business Application Programming) objects, or Microsoft's .NET. Further, while illustrated as internal to the device 102, one or more processes associated with the applications 116 may be stored, referenced, or executed remotely. For example, a portion of the applications 116 may be an interface to a web service that is remotely executed. Moreover, the applications 116 may be a child or sub-module of another software module (not illustrated).

The configuration files 118 can include any suitable parameters, variables, policies, algorithms, instructions, settings, or rules for configuring software of the device 102. For example, the configuration files 118 may include a table that identifies settings for one or more applications 116. In some implementations, the configuration files 118 identify initial settings for one or more applications 116, and for other types of applications such as operating system settings. The configuration files 118 may be written in any suitable format, such as, for example, ASCII and line-oriented, etc.

The policies 120 may include any parameters, variables, policies, algorithms, instructions, settings, or rules for enabling or preventing access to resources in one or more perimeters. For example, the policies 120a may identify a resource external to the perimeter 110a that is accessible by a resource inside the perimeter 110a. A policy of a given perimeter may include or otherwise identify the accessibility of the perimeter generally, the accessibility of specific resource in the perimeter, the ability of resources in the perimeter to access other perimeters, and other accessibility information. A policy may specify accessibility by user, action type, time period, or otherwise. In some implementations, a policy may identify specific resources of a perimeter that are accessible to external resources. For example, the policies 120a for the perimeter 110a may indicate that a specific application in another perimeter 110b may or may not access the data or resources in the first perimeter 110a. As another example, the policies 120a for the perimeter 110a may indicate that any of the applications in the other perimeters 110b or 110c may or may not access the data or resources in the first perimeter 110a.

In some implementations, policies 120 may define or otherwise identify a process for user authentication. For example, the policies 120 may identify the type and content of user authentication (e.g., password strength, lifecycle) to apply to a cross-perimeter request. When a user provides a request to access to multiple perimeters, the request may be evaluated by the policies of both perimeters. In some instances, if both policies grant access, then the cross-perimeter request may be granted.

The device 102 may be connected to multiple networks, such as the enterprise network 104a and the other networks 104b. The enterprise network 104a can include a wireless network, a virtual private network, a wired network, or any suitable network. The enterprise can be a corporate or business entity, a government body, a non-profit institution, or another organization. The enterprise may be the device owner 105. The enterprise may also lease the device 102 or may hire contractors or agents who are responsible for maintaining, configuring, controlling, or managing the device 102. The other networks 104b can include any suitable networks that are accessible by a user. For example, the other networks can include a public network that the user has an account for, a private network, an ad hoc network, or another type of network. In some cases, the other networks 104b include a cellular data network. In some cases, the other networks 104b include a user's home network.

The networks 104a and 104b facilitate communication with the device 102. Either of the networks 104a and 104b may communicate, for example, Internet Protocol (IP) packets, Frame Relay frames, Asynchronous Transfer Mode (ATM) cells, voice, video, data, and other suitable information between network addresses. In addition, while the enterprise network 104a and the other networks 104b are each illustrated as a single network, each network may include multiple networks and may provide access to additional networks. In short, the enterprise network 104a and the other networks 104b may include any suitable network configured to communicate with the device 102.

Figure 2:
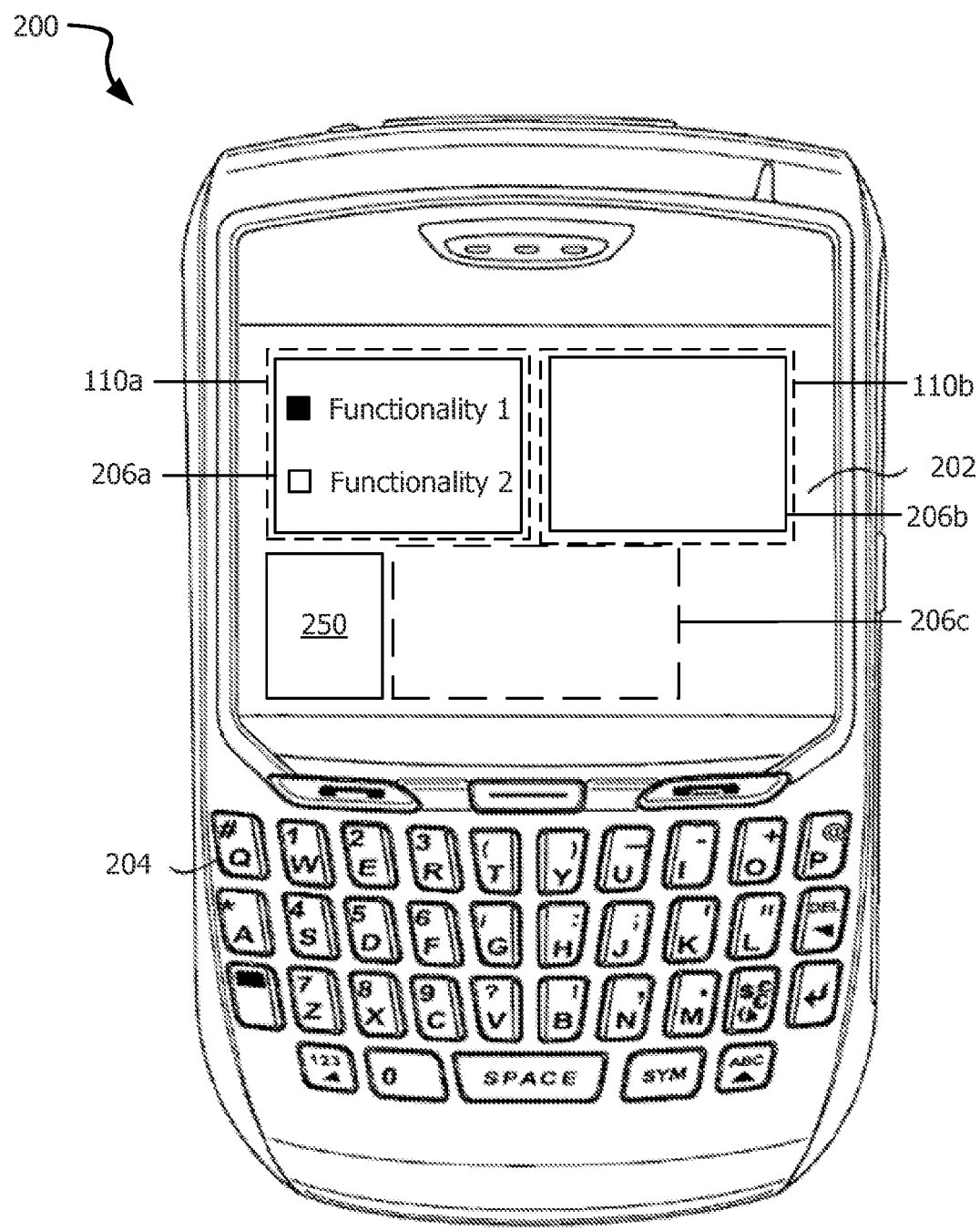
FIG. 2 is a diagram showing an example mobile device.

FIG. 2 is a diagram showing an example mobile device 200, which includes a display 202, an optional keyboard 204, and additional features. Multiple applications can be installed on and executed by the device 200. In some implementations, the applications can be installed in a hierarchy of applications, each of which can be assigned to one or more perimeters (for example, perimeters 110a, 110b) included in the device 200. Each application can be executed by the device 200 to collectively provide varying degrees of secure access to data available through the device 200. An application's access to data or execution on the device 200 can depend on a permission setting applied to the application. The permission setting applied to an application can be based on priority rankings that the device 200 determines for each of multiple management policies defined for the application.

A management policy can include permissions that can be applied to an application. For example, an enterprise policy can permit the application to access only enterprise data. A first user's policy can be a parental policy that may either permit or may not permit execution of the application. A second user's management policy either may or may not be able to override the parental policy. The device's management policy may restrict execution of the application to certain geographical locations, for example. Thus, while the multiple management policies can define multiple permission settings that can be applied to the application, two or more management policies may have conflicting permissions. For example, a parental policy may deny permission to uninstall a device-tracking application even if a user policy grants permission to uninstall the application.

In some implementations, the device 200 can implement a centralized policy engine 250 that can receive the permissions defined by each management policy and determine a priority ranking for each policy. The centralized policy engine 250 can be implemented as computer software instructions executable by the device 200. The engine 250 can be in communication with the device 200, each perimeter included in the device 200, various networks with which the device 200 can communicate including, for example, providers of applications executable by the device 200, data stored on the device 200, and the like. The engine 250 can be included in the device 200 or can be outside the device 200. For example, the engine 250 can be implemented as a computer server system that communicates with the device 200 over one or more of the networks shown in FIG. 3.

In some implementations, a management policy for an application can be defined using the device 200. For example, the device 200 can execute the centralized policy engine 250 to provide one or more perimeter manager interfaces (for example, interfaces 206a, 206b, 206c) showing permissions associated with management policies that can be defined or edited or both. In some implementations, the device 200 can receive input to execute the engine 250. When the device 200 executes the engine 250 in response to the input, the engine 250 can cause the interfaces to be displayed in the display 202. As described below, a user can define permissions associated with an application by selecting functionalities (such as Functionality 1, Functionality 2, and the like) displayed within the perimeter manager interface.

In some implementations, the engine 250 can display a perimeter manager interface within each perimeter included in the device 200 and can additionally display at least one perimeter manager interface outside any of the perimeters included in the device 200. For example, the engine 250 can display the perimeter manager interface 206a within the personal perimeter 110a when a user installs an application on the device 200 (for example, by downloading the application) and assigns the application to the personal perimeter 110a. The engine 250 can display the perimeter manager interface 206a within the personal perimeter 110a automatically upon installing the application. Alternatively, the engine 250 can display the perimeter manager interface 206a upon the first instance of the user launching the application. Within the perimeter manager interface 206a, the engine 250 can display multiple functionalities that collectively define the permissions associated with the application.

The engine 250 can prompt the user of the device 200 to select one or more functionalities displayed in the interface. The displayed functionalities may include those requested by the developer of the application. The device 200 can grant permissions based on the user's selection or selections. For example, the device 200 can grant access to personal data assigned to the personal perimeter 110a if allowed by the user. The device 200 can grant access to enterprise contacts assigned to the enterprise perimeter 110b based on both the user's selections and based on the enterprise's policy of allowing applications to access enterprise contacts. In this manner, the engine 250 can enable the user to select functionalities that define permissions applicable to applications.

The permissions described in the foregoing example can be included in a user management policy. As described above, other management policies can include a vendor management policy, a parental control management policy, an enterprise management policy, a perimeter management policy, and the like. For those management policies with editable functionalities, the engine 250 can provide one or more perimeter manager interfaces to permit a provider of the management policy to select (or de-select) one or more functionalities. In addition, the engine 250 can determine that some of the management policies have fixed (i.e., non-editable) functionalities and responsively may not provide perimeter manager interfaces. A permission setting that is applied to an application that the device 200 executes is determined, at least in part, based on the multiple functionalities of the multiple management policies.

A set of management policies can be assigned specific priority rankings for each application on the device 200, or for each instance of an application running on the device 200. For a given set of management policies, the priority rankings can be different for each application or for each instances of an application.

In some implementations, to apply a permission setting to an application, the engine 250 can determine priority rankings for management policies based on the source or origin of the management policies. For example, the engine 250 may determine that one management policy is the device owner's policy and another management policy is a user's policy, and the engine 250 may assign a higher priority ranking to the device owner's policy. The engine 250 can have an algorithm or configuration file that specifies how management policies are ranked according to the source or origin of each respective management policy. A device owner's management policy can be given a higher priority ranking or a lower priority ranking than a perimeter administrator's management policy, for example, based on the algorithm or configuration. A device owner's management policy can be given a higher priority ranking or a lower priority ranking than a user's management policy, for example, based on the algorithm or configuration. A perimeter administrator's management policy can be given a higher priority ranking or a lower priority ranking than a user's management policy, for example, based on the algorithm or configuration.

In some implementations, to apply a permission setting to an application, the engine 250 can determine priority rankings for management policies based on conflicts between the management policies. For example, if the engine 250 determines that a first management policy is more restrictive than a second management policy, then the engine 250 can assign a higher priority ranking to the second management policy. Alternatively, the engine 250 can assign a higher priority ranking to the first management policy, which is less restrictive relative to the second management policy. In this manner, the engine 250 can rank the multiple management policies from most restrictive to lease restrictive (or vice versa). Accordingly, the engine 250 can apply a permission setting to the application based on the highest ranked or lowest ranked management policy (or based on a policy with an intermediate priority ranking)

In some implementations, to apply a permission setting to an application, the engine 250 can determine the priority rankings for each management policy based in part on data requested by the application. For example, if the application requests data that is enterprise data (i.e., data assigned to the enterprise perimeter 110b), then the engine 250 can assign a highest priority ranking to an enterprise management policy. Similarly, if the application requests network resources that are received over a particular network, then the engine 250 can assign a highest priority ranking to a network management policy.

In some implementations, the engine 250 can determine priority rankings for the multiple management policies at the time of installing the application on the device 200, and can maintain the priority rankings for the duration that the application remains installed on the device 200. Alternatively, the engine 250 can determine priority rankings for the multiple management policies periodically. For example, the engine 250 can determine new priority rankings each time that the application is launched on the device 200. In another example, the engine 250 can determine new priority rankings one or more times within a fixed time period (for example, a day, a week, a month, and the like).

In some implementations, the engine 250 can determine if management policies for the application remain in effect, for example, for each instance of the application being launched. A source of a management policy may have rescinded the policy. In response to determining that a source from which a management policy was received has rescinded the policy, the engine 250 can re-calculate a new priority ranking for each of the remaining management policies.

In some cases, the source of the management policy can alter a permission setting defined for the application. For example, the parental control management policy may define three permission settings for an application: enabled, disabled, and banned. If the device 200 determines that the parental control permission setting for an application is disabled, then the device 200 can perform one or more of preventing the application from launching, shutting down any running instances of the application, visually disabling the application on the home screen, or de-registering the application from the invocation framework. If the application has already been installed, then the device 200 may permit the application to remain on the device 200. The device 200 may also permit the application to be installed on the device 200 but not permit launching the installed application. If, on the other hand, the device 200 determines that the parental control permission setting for an application is banned, then the device 200 can immediately uninstall the application from the device 200 or block future installations of the application on the device (or both). Applications for which the parental control permission setting is enabled are neither disabled nor banned, and consequently have no restrictions.

In some implementations, the engine 250 can detect a change in a management policy and update priority rankings accordingly. For example, when determining a priority ranking for the parental control management policy, the engine 250 can determine that the parental control permission setting is enabled. If the application has no restrictions, the engine 250 can determine a lower priority ranking for the parental control management policy relative to other management policies. Subsequently, the engine 250 can determine that the parental control permission setting has been changed from enabled to disabled. In response, the engine 250 can determine a new priority ranking for the parental control management policy that is greater than when the permission setting for the application was enabled. Similarly, the engine 250 can determine a new priority ranking for the parental control management policy in response to determining that the setting has been changed from enabled to banned. In such instances where a restriction level of a management policy changes based on permission settings, the engine 250 can assign a highest priority ranking to the policy when the permission setting is most restrictive and a lowest priority ranking to the policy when the permission setting is least restrictive.

In some implementations, the management policies are assigned priority rankings independent of the permission settings specified by the individual management policies. For example, the engine 250 may be configured to assign a higher priority ranking to a parental management policy and a lower priority ranking to a user's management policy regardless of whether one of the management policies is more or less restrictive; the engine 250 may be configured to assign a higher priority ranking to a device owner's management policy and a lower priority ranking to a user's management policy regardless of whether one of the management policies is more or less restrictive; the engine 250 may be configured to assign a higher priority ranking to one perimeter's management policy and a lower priority ranking to another perimeter's management policy regardless of whether one of the management policies is more or less restrictive; etc.

In some cases, when one or more of the management policies changes, the priority rankings can remain unchanged. For example, in some cases changing the parental management policy to be more or less restrictive does not affect the priority ranking of the parental management policy for an application. In such cases, although the priority ranking of the parental management policy for an application is unaffected, the permission setting applied to the application may nonetheless be modified in response to the updated parental management policy. For example, if the parental management policy has the highest priority ranking for an application, any change to the parental management policy can affect the permission setting applied to the application.

Figure 3:
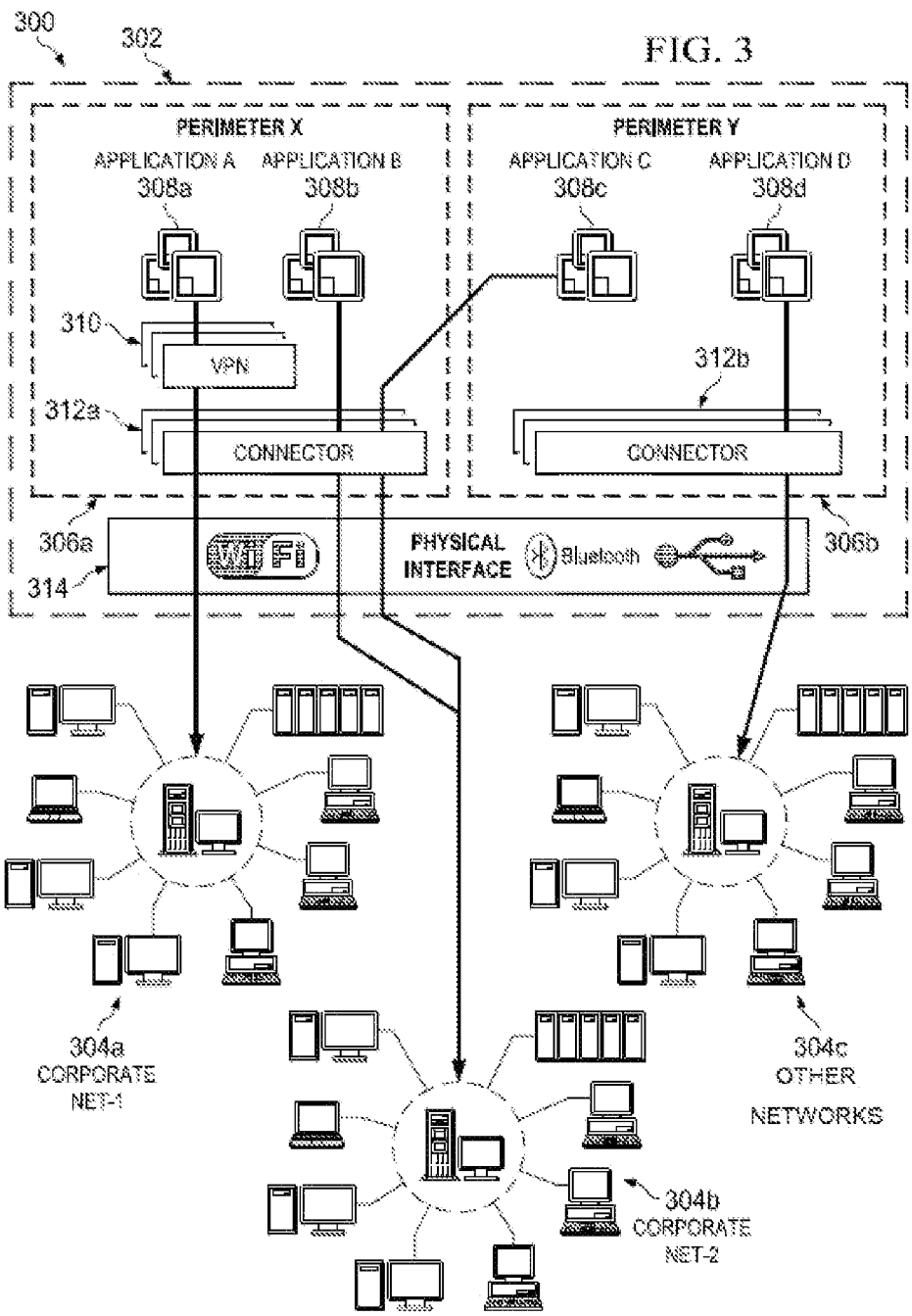
FIG. 3 is a schematic diagram showing example uses of resources on a mobile device.

FIG. 3 is a schematic diagram showing example uses of network resources by a mobile device. The example uses shown in FIG. 3 may occur at different times, or they may occur concurrently. In the example shown, the device 302 is configured to communicate with corporate networks 304a and 304b and a non-corporate network 304c. The corporate networks 304a and 304b can include a virtual private network of an enterprise, a private Wi-Fi network of an enterprise, a wired network of the enterprise, or another network that is administered by the enterprise. The non-corporate network can include, for example, a publicly-accessible Wi-Fi network, a cellular data network, a personal wireless network, or another type of network. Each network with which the device 302 is configured to communicate can define a respective network management policy based on which the device 302 can determine a permission setting for an application that attempts to communicate with the network.

The device 302 includes an enterprise perimeter 306a and a personal perimeter 306b. The enterprise perimeter 306a includes the enterprise applications 308a and 308b, and the personal perimeter 306b includes the personal applications 308c and 308d. The enterprise perimeter 306a includes virtual private network data 310 and enterprise connection data 312a. The personal perimeter includes other connection data 312b. Similarly to each network, each perimeter can also define a respective perimeter management policy based on which the device 302 can determine a permission setting for an application that either executes within the perimeter or that attempts to access data assigned to the perimeter (or both).

The device 302 can access the corporate networks 304a and 304b using the network resources of the enterprise perimeter 306a, and the device can access the non-corporate network 304c using the network resources of the personal perimeter 306b. Each of the networks 304a, 304b, and 304c may, in some cases, provide access to other systems. For example, one or more of the networks 304a, 304b, and 304c may provide Internet access for the device 302. Some networks may only provide access to specific servers, databases, or systems. For example, the corporate network 304a may provide access only to corporate e-mail servers. The device 302 may be connected to any of the networks 304a, 304b, and 304c through any suitable component or components of the physical interface 314. The connection hardware may include, for example, a Wi-Fi connection, a cellular connection, Bluetooth, Universal Serial Bus (USB), Radio Frequency Identification (RFID), Near Field Communication (NFC), or other connection technologies.

The virtual private network data 310 provides secure connectivity with the corporate network 304a. In the example shown in FIG. 3, the virtual private network data 310 are used to route enterprise data traffic for the enterprise application 308a to the corporate network 304a. The enterprise connection data 312a in the enterprise perimeter 306a provides connectivity with the corporate network 304b, and the other connection data 312b in the personal perimeter 306b provides connectivity with other networks 304c. In the example shown in FIG. 3, the enterprise connection data 312a are used to route enterprise data traffic for the enterprise application 308b to the corporate network 304b, and enterprise connection data 312a are also used to route personal data traffic for the personal application 308c to the corporate network 304b.

In some implementations, the connection data 312a and 312b may include encryption information, network settings and information, passwords, certificates, and other data. As described above, each perimeter may include a perimeter management policy for applications and network resources within the perimeter, outside the perimeter, or both. For example, the device 302 can include an enterprise perimeter management policy (e.g., a policy assigned to the enterprise perimeter 306a) that allows corporate applications in the corporate perimeter 306b to access data (e.g., the other connection data 312b, or other data) in the personal perimeter 306b. Management policies that determine permission settings for applications can also be defined by additional entities that communicate with the device 302, for example, an enterprise, one or more users, and the like. In addition, the device 302 itself can define a management policy. Moreover, a source from which an application is received (for example, a provider of the application) can define a management policy that can affect an execution of the application by the device 302 and access to the application by one or more users of the device 302. Consequently, in some implementations, the multiple management policies can include at least two of an enterprise policy, a personal policy, an application policy, a parental policy, or a device policy.

In some situations, management policies from different sources may intersect. For example, a personal perimeter management policy and an enterprise perimeter management policy can each specify respective permissions regarding personal applications (i.e., applications included in the personal perimeter 110a) accessing work contacts included in an enterprise perimeter 110b. If both perimeter management policies permit, then all personal applications can have respective permission settings to access work contacts. A vendor management policy can intersect with the perimeter management policies. For example, if a vendor specifies that only applications provided by the vendor can access data outside of a perimeter in which the application is installed, then the vendor management policy can be ranked higher than the other policies and only those applications that are both provided by the vendor and included in the personal perimeter can access work contacts. However, if a user defines a user management policy that personal applications cannot access data not included in the personal perimeter, then the user management policy may be ranked higher than all other management policies. To the contrary, if the user does not specify such access (for example, as a functionality in the perimeter manager interface), then the user management policy may be ranked lower than the other policies.

FIG. 4 is a flow chart showing an example process 400 for managing permission settings to applications on a mobile device. The process 400 can be implemented by a user device in a communication system. For example, the process 400 can be implemented by the device 102 shown in FIG. 1, the device 200 shown in FIG. 2, the device 302 shown in FIG. 3, or by another type of system or module. The example process 400 shown in FIG. 4 can be implemented using additional, fewer, or different operations, which can be performed in the order shown or in a different order. In some implementations, one or more of the operations can be repeated or iterated, for example, until a terminating condition is reached.

In some implementations, the device includes a personal perimeter associated with a user of the device. The applications in the personal perimeter may include any suitable applications, for example, calendar, e-mail, games, tools, and the like. A device may include multiple personal perimeters, and each personal perimeter can be associated with the same user, or they may each be associated with different users. For example, multiple users may be authorized to use the device, and each user may have his or her own personal perimeter on the device. Each personal perimeter can be associated with a respective management policy. Alternatively, each user can be associated with a respective management policy, which is also associated with the personal perimeter with which the user is associated.

In some implementations, the user device includes an enterprise perimeter associated with an enterprise (for example, business corporation, partnership, or other enterprise). For example, the enterprise may own the device and assign the device to a particular user. The enterprise perimeter can include any suitable network resources, for example, virtual private network account, Wi-Fi access data, and the like. Such an enterprise may also define and associate a management policy for the device or for the user or both. The management policy that the enterprise defines for the device can be uniform irrespective of the user of the device. Alternatively, the enterprise can define a management policy for each user of the device. An enterprise administrator may setup the device policies or configure the device for enterprise use. In some instances, the user device includes multiple enterprise perimeters. Each enterprise perimeter can be associated with the same enterprise, or they may each be associated with different enterprises. For example, the user may own the device and have perimeters for each enterprise with which he or she is associated.

At 410, the device identifies multiple management policies that apply to an application associated with a perimeter on the device. For example, the device may identify a user's management policy, a device owner's management policy, a parental management policy, an enterprise management policy, one or more perimeter management policies, etc. Some or all of the identified management policies can have different permission or access settings. For example, one of the management policies may permit access to all resources in a specified perimeter, while another of the management policies denies access to specified resources in the same perimeter.

At 420, the device determines, for the application, a priority ranking for each of the multiple management policies. The device determines the priority ranking for at least one of the management policies based on the perimeter with which the application is associated. For example, a user's personal management policy can be assigned a higher ranking when it is applied to applications running in the user's personal perimeter and a lower ranking when it is applied to applications running in another perimeter (e.g., the enterprise perimeter). As another example, a perimeter's management policy can be assigned a higher ranking when it is applied to applications running in that perimeter and a lower ranking when it is applied to applications running outside the perimeter (e.g., in another perimeter).

The priority ranking for a given management policy can be determined based on the source of the management policy. For example, a device owner's management policy can be assigned a higher priority ranking than a device user's management policy. In some cases, multiple management policies have the same priority ranking, or all management policies can be given different priority rankings. The priority ranking for a given management policy can be determined based on the content of the management policy. For example, more restrictive management policies can be assigned a higher or lower priority ranking than less restrictive management policies.

At 430, the device applies a permission setting to the application based on the priority rankings for the multiple management policies. The permission settings applied to the application can be the permission setting of the highest-ranked management policy. The permission settings applied to the application can be a combination of permission settings derived from multiple highly-ranked management policies.

In some cases, the highest-ranked management policy is less restrictive than other management policies that have lower priority rankings. In such cases, the permission settings applied to the application may permit an action that would not be permitted by one or more of the management policies having the lower priority rankings. In some cases, the highest-ranked management policy is more restrictive than other management policies that have lower priority rankings. In such cases, the permission settings applied to the application may prohibit an action that would not be permitted by one or more of the management policies having the lower priority rankings.

In some aspects of what is described here, an unlimited number of authorized policy providers provide policy decisions for a device. The device can sort or triage among the relevancy and relative priority of these policy providers in different contexts.

In some aspects of what is described here, multiple management policies that apply to an application associated with a perimeter on a device are identified. A priority ranking for each management policy is determined for the application based on the perimeter with which the application is associated. A permission setting based on the priority rankings is applied to the application.

Implementations of these and other aspects may include one or more of the following features. The multiple management policies can include at least two of: an enterprise policy, a personal policy, an application policy, a parental policy, or a device policy. The multiple management policies can include a first management policy and a second management policy. Applying the permission setting to the application based on the priority rankings for the multiple management policies can include determining that the first management policy conflicts with the second management policy, and applying the second management policy in response to determining that the second management policy has a higher priority ranking than the first management policy. The permission settings can be based on a management policy having the highest priority ranking. The management policy having the highest priority ranking can be the most restrictive management policy of the multiple management policies. The management policy having the highest priority ranking can be the least restrictive management policy of the multiple management policies. The priority ranking for each of the multiple management policies can be determined based in part on data requested by the application. The priority rankings can be determined for an instance of the application being launched on the device. New priority rankings can be re-determined for each new instance of the application being launched on the device. The multiple management policies can be received from one or more sources. It can be determined that a source from which a management policy was received has rescinded the management policy. In response to determining that the source has rescinded the management policy, a new priority ranking can be calculated for each of the remaining management policies. A perimeter manager interface can be provided on the device. In the perimeter manager interface, functionalities for editing a management policy can be provided.

A number of implementations have been described. Nevertheless, it will be understood that various modifications may be made. Other variations in the order of steps are also possible. Accordingly, other implementations are within the scope of the following claims.

What is claimed is:

1. A computer-implemented method comprising:
   identifying a plurality of management policies that apply to an application associated with a first perimeter of a plurality of perimeters on a device, each perimeter being associated with a separate file system on the device, wherein each of the plurality of management policies determines whether a resource on the device can be accessed, the plurality of management policies includes a first management policy and a second management policy and the plurality of management policies are received from one or more sources;
   determining, for the application, a priority ranking for each of the plurality of management policies, wherein the priority ranking for at least one of the management policies is determined based on the association of the application with the first perimeter;
   applying a permission setting to the application based on the priority rankings for the plurality of management policies, wherein applying the permission setting comprises:
      determining that the first management policy conflicts with the second management policy; and
      applying the second management policy in response to determining that the second management policy has a higher priority ranking than the first management policy;
   determining that a source from which a management policy was received has rescinded the management policy; and
   in response to determining that the source has rescinded the management policy, re-calculating a new priority ranking for each of remaining management policies.

2. The method of claim 1, wherein the plurality of management policies includes at least two of: an enterprise policy, a personal policy, an application policy, a parental policy, or a device policy.

3. The method of claim 1, wherein the plurality of management policies includes at least two management policies provided by different policy providers.

4. The method of claim 1, wherein the permission setting is based on a management policy having the highest priority ranking.

5. The method of claim 4, wherein the management policy having the highest priority ranking is the most restrictive management policy of the plurality of management policies.

6. The method of claim 4, wherein the management policy having the highest priority ranking is the least restrictive management policy of the plurality of management policies.

7. The method of claim 1, further comprising determining the priority ranking for each of the plurality of management policies based in part on data requested by the application.

8. The method of claim 1, wherein the priority rankings are determined for an instance of the application being launched on the device, and new priority rankings are re-determined for each new instance of the application being launched on the device.

9. The method of claim 1, further comprising:
   providing, on the device, a perimeter manager interface; and
   providing, in the perimeter manager interface, functionalities for editing a management policy.

10. A device comprising:
    data processing hardware apparatus; and
    a computer-readable medium storing instructions executable by the data processing hardware apparatus to perform operations comprising:
       identifying a plurality of management policies that apply to an application associated with a first perimeter of a plurality of perimeters on a device, each perimeter being associated with a separate file system on the device, wherein each of the plurality of management policies determines whether a resource on the device can be accessed, the plurality of management policies includes a first management policy and a second management policy and the plurality of management policies are received from one or more sources;
       determining, for the application, a priority ranking for each of the plurality of management policies, the priority ranking for at least one of the management policies determined based on the association of the application with the first perimeter;
       applying a permission setting to the application based on the priority rankings for the plurality of management policies, wherein applying the permission setting comprises:
          determining that the first management policy conflicts with the second management policy; and
          applying the second management policy in response to determining that the second management policy has a higher priority ranking than the first management policy;
       determining that a source from which a management policy was received has rescinded the management policy; and
       in response to determining that the source has rescinded the management policy, re-calculating a new priority ranking for each of remaining management policies.

11. The device of claim 10, wherein the plurality of management policies includes at least two of: an enterprise policy, a personal policy, an application policy, a parental policy, or a device policy.

12. The device of claim 10, wherein the permission setting is based on a management policy having the highest priority ranking.

13. The device of claim 12, wherein the management policy having the highest priority ranking is the most restrictive management policy of the plurality of management policies.

14. A non-transitory computer-readable medium storing instructions executable by data processing hardware apparatus to perform operations comprising:
    identifying a plurality of management policies that apply to an application associated with a first perimeter of a plurality of perimeters on a device, each perimeter being associated with a separate file system on the device, wherein each of the plurality of management policies determines whether a resource on the device can be accessed, the plurality of management policies includes a first management policy and a second management policy and the plurality of management policies are received from one or more sources;

determining, for the application, a priority ranking for each of the plurality of management policies, wherein the priority ranking for at least one of the management policies is determined based on the association of the application with the first perimeter; and applying a permission setting to the application based on the priority rankings for the plurality of management policies, wherein applying the permission setting comprises:
- determining that the first management policy conflicts with the second management policy; and
- applying the second management policy in response to determining that the second management policy has a higher priority ranking than the first management policy;

determining that a source from which a management policy was received has rescinded the management policy; and in response to determining that the source has rescinded the management policy, re-calculating a new priority ranking for each of remaining management policies.

15. The non transitory computer-readable medium of claim 14, wherein the permission setting is based on a management policy having the highest priority ranking, and wherein the management policy having the highest priority ranking is the least restrictive management policy of the plurality of management policies.

16. The non transitory computer-readable medium of claim 14, the operations further comprising determining the priority ranking for each of the plurality of management policies based in part on data requested by the application.

17. The non transitory computer-readable medium of claim 14, wherein the priority rankings are determined for an instance of the application being launched on the device, and new priority rankings are re-determined for each new instance of the application being launched on the device.

* * * * *